Figure 7:
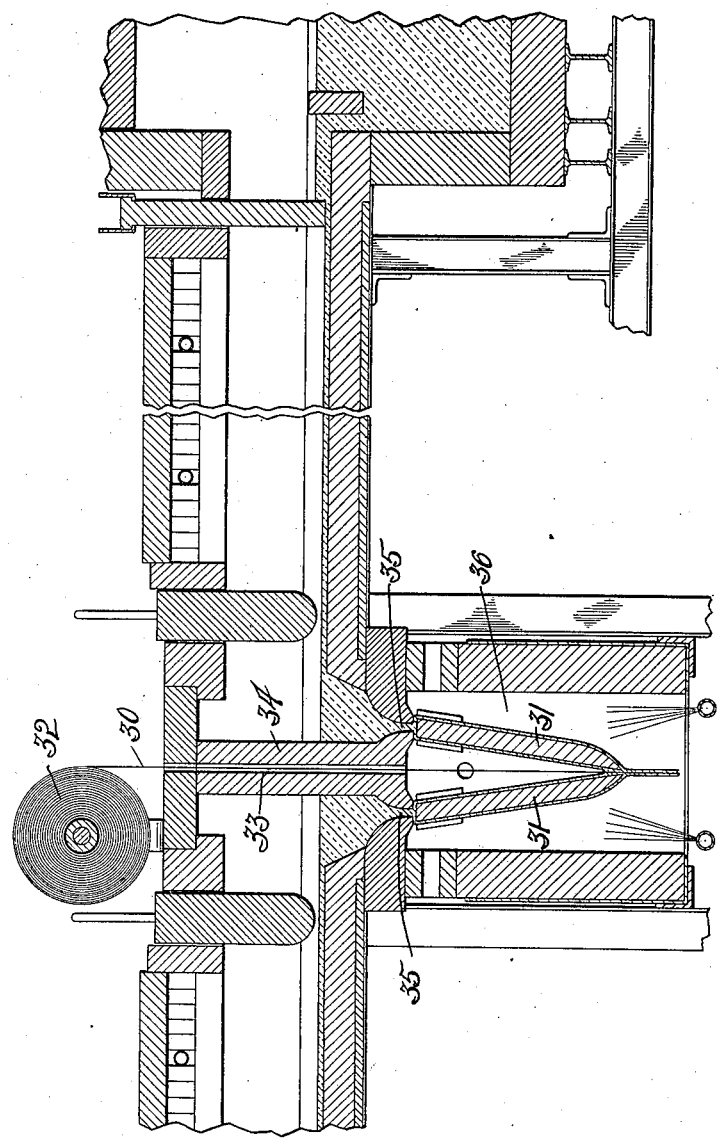

Nov. 12, 1929.   E. DANNER   1,734,964
METHOD AND APPARATUS FOR MANUFACTURING CONTINUOUS GLASSWARE
Filed Nov. 17, 1921   3 Sheets-Sheet 1
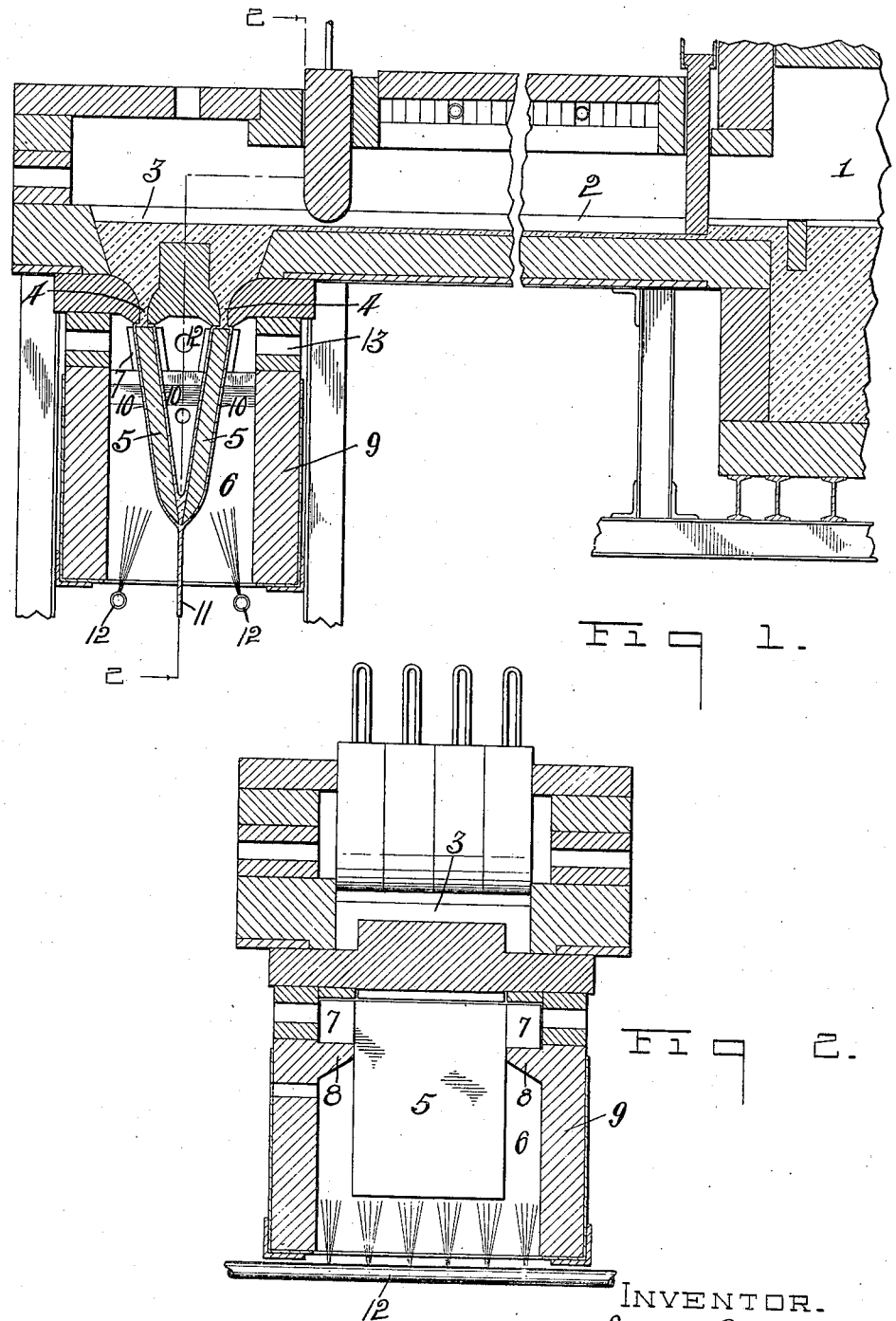

Nov. 12, 1929. E. DANNER 1,734,964
METHOD AND APPARATUS FOR MANUFACTURING CONTINUOUS GLASSWARE
Filed Nov. 17, 1921 3 Sheets-Sheet 2
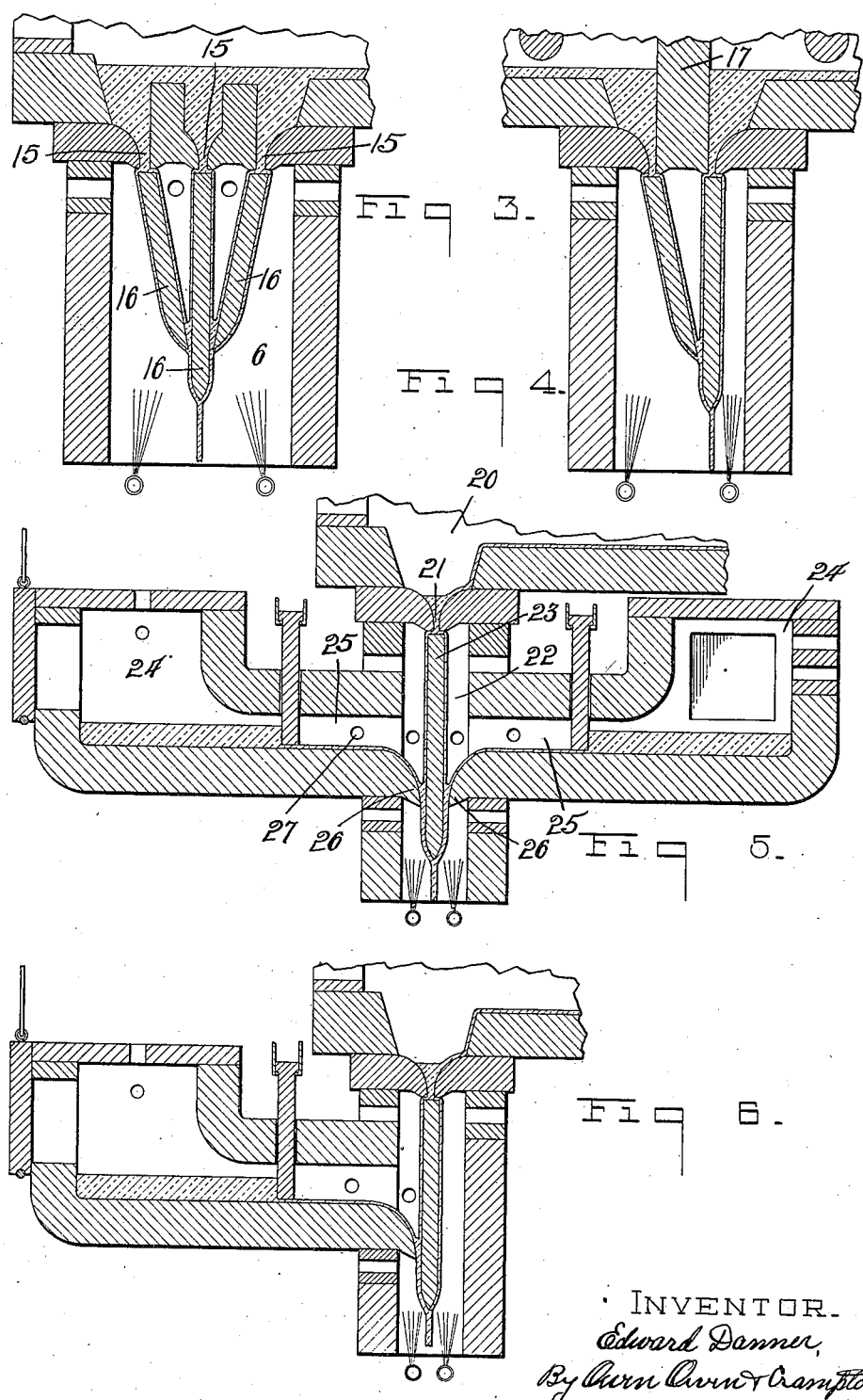
INVENTOR.
Edward Danner,
By Owen Owen & Crampton
Attys.

Nov. 12, 1929.  E. DANNER  1,734,964
METHOD AND APPARATUS FOR MANUFACTURING CONTINUOUS GLASSWARE
Filed Nov. 17, 1921  3 Sheets-Sheet 3

INVENTOR.
Edward Danner,
By Owen Owen & Crampton,
Attys.

Patented Nov. 12, 1929

1,734,964

UNITED STATES PATENT OFFICE

EDWARD DANNER, OF TOLEDO, OHIO

METHOD AND APPARATUS FOR MANUFACTURING CONTINUOUS GLASSWARE

Application filed November 17, 1921. Serial No. 515,759.

This invention relates to the manufacture of glassware, and particularly to a method and apparatus for forming sheet glass.

An object of the invention is to increase the speed of tempering, flowing and forming continuous glassware, particularly sheet glass, over what is possible by the method and apparatus disclosed in my Patents No. 1,555,358, issued September 29, 1925; No. 1,627,428, issued May 3, 1927, and No. 1,697,227, issued January 1, 1929, by flowing three or more films of glass from a source or sources of supply, separately tempering the films, and then integrally uniting them into a single sheet.

A further object of the invention is the production of glassware, particularly sheet glass, of different shades or colors, in a rapid, efficient and inexpensive manner by flowing a plurality of films of glass, a portion at least of which are of different color or characteristics from the others, from sources of supply and uniting the several films into a single film, the sources of supply being different, at least for the films having different colors or characteristics.

The invention is fully described in the following specification, and while the method is capable of being practiced by numerous apparatus a few embodiments only of such apparatus are illustrated in the accompanying drawings, in which,—

Figure 1 is a central vertical longitudinal section of a furnace embodying the invention, with parts thereof broken away. Fig. 2 is a cross-section on the line 2—2 in Fig. 1. Fig. 3 is a fragmentary central longitudinal section of an apparatus similar to Fig. 1, having three outlets in communication with a common source of molten glass supply. Fig. 4 is a similar view of a different form of the invention in which the sheet is formed from glass flowing from different sources of supply. Fig. 5 is a similar view of a further modification of this embodiment wherein the sheet is formed from three separate sources of molten glass supply. Fig. 6 is a similar view showing another modification of an apparatus whereby a single sheet is formed from molten glass flowing from two different sources, and Fig. 7 is a central vertical longitudinal section of an apparatus wherein a reinforcing means is introduced into a sheet formed from glass flowing down separate directing members.

Referring to the drawings, 1 designates a furnace or tank containing a molten glass supply and which may constitute the melting or refining tank of a furnace, 2 a horizontal spout forming the main tempering chamber through which the glass flows from the tank 1 to a hopper 3 formed in the bottom of the chamber at its forward end, and having, in the present instance, two narrow bottom discharge slots or openings 4 in transversely spaced relation. The molten glass flows from each discharge slot 4 down onto the upper end portion of a respective directing slab or member 5, one of which is provided for each discharge opening. The slabs or directing members 5 are supported in a tempering chamber 6 in any suitable manner, as, for instance, by providing the slabs at their side edges near their upper ends with bosses or projections 7 adapted to rest on shelves or projections 8 provided on the inner sides of the wall 9 forming the tempering chamber 6, as more fully set forth in my copending application No. 443,752. The slabs 5 are preferably disposed with their upper ends immediately below the respective discharge slots 4 in slightly spaced relation to the lower edges thereof so that the streams of molten glass flowing down onto a slab are divided and form two relatively thin streams or films which pass down opposite sides of the slab. The slabs terminate at their lower ends in a more or less sharp edge to permit a merging at such point into a single stream of the films 10 flowing down the slab. The slabs are also disposed in downwardly converging relation with their lower edges slightly spaced so that the inner and outer films flowing down both slabs join together before leaving the slabs and pass therefrom in a single stream 11. It will be understood that the stream 11 is taken away as rapidly as formed, permitted to set and is annealed.

The temperature within the tempering chamber 6 is maintained in proper condition for tempering the glass flowing down the slabs by directing flames into the chamber from burners 12, or in any other suitable manner. While it is usually necessary to effect a heating of the chamber 6 in some manner, occasion might arise calling for the introduction of a cooling medium into the chamber in order to provide the proper tempering condition therein to suit the particular glass or ware being acted on. The slabs 5 are preferably of less width than the chamber 6 to permit the free circulation of the tempering gases therearound so that a uniform condition may be maintained within the chamber both between and at the outer sides of the slabs. The walls of the tempering chamber are provided at their upper ends with flues 13 for the outlet of gases from the chamber so that a circulation of the tempering gases may be maintained within the chamber.

In my Patent No. 1,555,358, I have disclosed means for dividing a stream of molten glass, as it flows from a source of supply, into two films which flow a distance through a tempering chamber and then unite to form a single sheet, the glass being tempered while in the thin film state. It is evident that with the present arrangement, wherein more than two films of molten glass flow through a tempering atmosphere and then merge into a single sheet, the films may be of less thickness, and therefore more susceptible to the tempering action, than where only two films are employed, thus enabling the final tempering of the glass before the sheet is formed to be accomplished more rapidly than when only two films are employed. By increasing the speed of the tempering, the speed of formation of a sheet is also increased.

In Fig. 3 the discharge hopper of the furnace is shown as having, in transversely spaced relation, three discharge outlets 15 for the molten glass so that three directing slabs or members 16 are employed, one for each discharge opening and being mounted and arranged in substantially the same manner as in the form shown in Fig. 1, with the exception that the center slab preferably extends down a greater length than the other with its sides in adjacent relation to the lower edges of the side slabs so that the inner and outer films flowing down each side slab merge with the film flowing down the adjacent side of the center slab, and the thicker films thus formed on the center slab unite at the lower or discharge end thereof into a single sheet.

In Fig. 4 the arrangement of slabs is the same as illustrated in Fig. 3, except that one of the side slabs is omitted. This figure also illustrates the idea of separating the discharge hopper of the furnace between two outlets by a wall or separating means 17 and supplying molten glass from different sources of supply to the hopper at opposite sides of the dividing partition. By the use of an apparatus having different slabs it is possible to employ glass having different shades, colors or other characteristics and to then combine the films or streams of different glass into a single sheet. It is important, however, in doing this that the co-efficient of expansion or contraction of the different glasses be the same or nearly so, in order that there will be no strains produced in annealing and cooling which would fracture the sheet, as is well understood in the art. A very fine grade and quality of obscure glass can be produced by an apparatus of this character, and such glass would have advantages which most of the present forms of obscure glass do not have. In the manufacture of most forms of obscure glass by the present methods the glass is left rough on one side which is objectionable in that it catches dust and dirt and is difficult to clean. Obscure glass formed by my method will be smooth and brilliantly polished on both sides.

In Fig. 5 an apparatus is illustrated which provides three sources of molten glass supply, one source comprising a chamber 20 in communication with any suitable source of molten glass supply, as, for instance, that illustrated in Fig. 1, and having a bottom discharge slot or opening 21 in communication at its outlet end with the upper end of the tempering chamber 22. A directing slab or member 23 extends down into the chamber 22 from adjacent to the discharge outlet 21 so that the molten glass discharged thereon from the outlet 21 flows in thin film form down opposite sides of the slab, the several films merging and flowing in single sheet form from the lower end of the slab. At each side of the tempering chamber 22 without the same is located a suitable source of molten glass supply illustrated, in the present instance, as being in the form of a pot 24 into which molten glass may be ladled from a melting source, and each pot 24 has a spout 25 opening into the respective side of the tempering chamber 22. The bottom of each spout terminates in a lip 26 adjacent to the respective side of the slab 23 near its lower end so that a thin film of glass flowing through the spout and over the lip will be caused to join and unite with the film of glass flowing down the respective side of the slab. In this form of apparatus 27 illustrates burner openings so that a proper tempering of the glass films may be obtained.

The apparatus illustrated in Fig. 6 is the same as that of Fig. 5 with the exception that one of the side supply sources is eliminated.

The apparatus shown in Fig. 7 illustrates the idea of introducing a reinforcing web fabric or other means 30 between the two slabs 31 and into the center of the sheet formed by the uniting of the films flowing down the slabs. The reinforcing means 30 feeds from a roll 32 or other suitable source down through a passage 33 formed in a wall 34 extending up from between the two discharge openings 35, the passage 33 opening at its lower end into the upper end of the tempering chamber 36 between the slabs. If it is desired to form the sheet with films of glass having different characteristics so that reinforced obscure glass, for instance, might be produced, the discharge openings 35 may be supplied with molten glass from different sources and the wall 34 may constitute a dividing wall between the sources.

It is evident that with my method a sheet of glass may be formed of any desired number of films depending on the thickness of the sheet desired, and that the films, due to the thinness of the same, may be rapidly tempered after leaving the source of supply and before merging into the sheet, thereby enabling the sheet to be formed in a rapid and efficient manner. It is also evident that sheets having many combinations of colors or tinted shades may be produced by this method in a rapid and inexpensive manner. For instance, a thin film of opal glass could be run or formed on one or both sides of a film of regular transparent glass, or films of glass of different colors or tints could be run on the opposite sides of a transparent glass or of glass of a different shade or characteristic.

It is also evident that by forming a sheet by means of any of the apparatus illustrated, the outer surfaces of the films forming the sides of the sheet will be perfectly smooth and fire polished and free from streaks. The subject matter of Figs. 5 and 6 is more specifically claimed in a copending application.

I wish it understood that the method comprising my invention may be modified in numerous respects and that the apparatus illustrated for practicing the same may also be varied without departing from the spirit of the claims.

Having thus described my invention, what I claim as new and desire to secure by Letters Patent, is,—

1. The method of forming continuous glassware which consists in freely flowing each of more than two films of molten glass a distance through a heated atmosphere and uniting the films into a single stream.

2. The method of forming continuous glassware which consists in freely flowing more than two streams of molten glass through a heated atmosphere and uniting the streams into a single stream before leaving such atmosphere.

3. The method of forming continuous glassware which consists in flowing each of more than two thin streams of molten glass a distance through a tempering atmosphere and uniting the streams while still molten into a single sheet, the inner surfaces only of the outer streams having contact with guiding means.

4. The method of forming continuous glassware which consists in freely flowing more than two films of molten glass by gravity a distance along respective guiding surfaces with their outer sides with respect to the guiding surfaces exposed to a heated atmosphere, uniting the films while still molten into a single stream and passing the stream into a cooling atmosphere.

5. The method of forming continuous glassware which consist in freely flowing more than two streams of molten glass from a common source of supply, subjecting each of the streams to a heated atmosphere, uniting the several streams while in a molten state into a single sheet and permitting it to cool.

6. The method of forming continuous glassware which consists in flowing molten glass in more than two streams along a plurality of heated converging directing members in the presence of a heated atmosphere, uniting the streams while still molten into a single stream and permitting it to cool.

7. The method of forming continuous glassware which consists in freely flowing molten glass in more than two thin streams along a plurality of directing members in the presence of a heated atmosphere, uniting the streams while still molten into a single sheet, and taking the sheet away as rapidly as formed and permitting it to cool.

8. The method of forming continuous glassware which consists in flowing molten glass in more than two thin streams along a plurality of directing members in the presence of a heated atmosphere, uniting the streams, while still molten, into a single sheet, and taking the sheet away as rapidly as formed and permitting it to cool, the inner surfaces only of the outer streams having contact with the directing members.

9. The method of making continuous glassware which consists in forming more than two streams of molten glass, tempering each stream solely by contacting gases, and uniting them into one article.

10. In an apparatus for forming continuous glassware, means forming at least one source of molten glass supply and directing the free flow of glass therefrom in more than two streams and causing the uniting of the several streams into a single sheet, said means also forming a tempering chamber into which the streams pass before uniting into a single sheet, and means for imparting predetermined temperature conditions in the chamber.

11. In an apparatus for forming continuous glassware, the combination with a source of molten glass supply having a plurality of discharge outlets, of a directing member for each outlet onto and along which a stream of glass flows from the outlet, the directing members converging and causing a uniting of the streams into a single sheet, and means for tempering the separate streams.

12. In an apparatus for forming continuous glassware, means for directing more than two streams of molten glass from a plurality of glass discharge outlets and merging the several streams while still molten and free flowing into a single sheet, and means for controlling the temperature of the several streams before merging.

13. In an apparatus for forming continuous glassware, means having several outlets for molten glass, and a directing member for each outlet with said members converging toward their outer ends whereby films of molten glass flowing along the directing members are caused to unite and flow from the several members in a single sheet.

14. In an apparatus for forming continuous glassware, means having several outlets for molten glass, a directing member for each outlet, with the members converging toward their outer ends whereby films of molten glass flowing along the directing members are caused to unite and flow from the several members in a single sheet, and means for tempering the films before uniting into a sheet.

15. In an apparatus for forming continuous glassware, means having several outlets for molten glass, a directing member for each outlet, with the members converging toward their outer ends whereby films of molten glass flowing along the directing members are caused to unite and flow from the several members in a single sheet, means forming a chamber around the directing members and means for providing predetermined temperature conditions in the chamber.

16. In an apparatus for forming continuous glassware, means for containing molten glass and having a plurality of outlets through which the glass flows by gravity from the means, means for forming a tempering chamber enclosing the outlets, and a slab projecting into the chamber from each outlet, the slabs converging at their outer ends, the molten glass flowing in separate films along the slabs and uniting into a single sheet at the outer ends of the slabs.

17. In an apparatus for forming continuous glassware, means for containing molten glass and having a plurality of outlets through which the glass flows by gravity from the means, a slab for each outlet down opposite sides of which the glass flows in separate films from the outlet, the slabs converging at their outer ends whereby the several films unite and pass in a single sheet from the slabs, and means for tempering the films before uniting.

18. In an apparatus for forming continuous glassware, means for directing the flow of molten glass from a source of supply, dividing the molten glass into more than two thin sheet-like films and then uniting the films into a single sheet, and means for tempering the films before uniting.

19. In an apparatus for forming continuous glassware, a plurality of directing members, and means to supply molten glass to substantially surround each member, the members being so arranged that glass flowing around and from them will unite and form one article.

20. In an apparatus for forming continuous glassware, means having a plurality of discharge outlets and for directing the flow of molten glass to the outlets, means forming a tempering chamber in communication with said outlets, means for creating a predetermined temperature condition in the chamber, and means for directing the flow of a stream of glass in separated films a predetermined distance through the chamber from each outlet and causing the films of all streams while still molten to unite and pass in single sheet form from the stream directing means.

21. In an apparatus for forming continuous glassware, means having two discharge outlets and for directing the flow of molten glass to the outlets, and a directing member for each outlet onto and along which glass flows in thin separated stream form from the respective outlet, the members being disposed to cause the streams after flowing a distance along the members to unite and flow therefrom in single sheet form.

22. In an apparatus for forming continuous glassware, means having two discharge outlets and for directing the flow of molten glass to the outlets, and a directing member for each outlet onto and along which glass flows in thin separated stream form from the respective outlets, the members being disposed to cause the streams after flowing a distance along the members to unite and flow therefrom in single sheet form, and means for maintaining a predetermined temperature condition within the space through which the streams pass.

23. In an apparatus for forming continuous glassware, means having two discharge outlets and for directing the flow of molten glass to the outlets, a directing member for each outlet disposed to cause glass flowing from the respective outlets to be divided into two streams which flow a distance along the member and then merge with each other and with the streams flowing down the other member and to flow therefrom in single sheet form.

24. In an apparatus for forming continuous glassware, means having two discharge outlets and for directing the flow of molten glass to the outlets, means forming the tempering chamber in communication with the outlet means for creating a predetermined temperature condition in the chamber, and a directing member for each outlet disposed within the chamber to cause glass flowing from the respective outlets to be divided into two streams which flow a distance along the member and then merge with each other and with the streams flowing along the other member and pass therefrom in single sheet form.

25. In apparatus for forming sheet glass, a receptacle for a pool of molten glass, the receptacle having a slot in its bottom, means for dividing into more than two streams the glass passing from the slot and reuniting said streams to form a single sheet.

26. In apparatus for producing sheet glass, a receptacle for a pool of molten glass, said receptacle having an opening in its bottom, and means within the glass dividing the glass flowing from the opening into more than two streams and guiding the streams into contact with each other while still molten so that they form a single sheet.

27. In apparatus for producing sheet glass, a receptacle for a pool of molten glass, said receptacle having a slot in its bottom, and a member within the glass adjacent each side of the slot and positioned so that the glass passing from the adjacent side of the slot passes outside said member and unites beneath said member with glass passing through the inner part of the slot.

28. In apparatus for forming sheet glass, a receptacle for a pool of molten glass, the receptacle having a slot in its bottom, a member arranged centrally of the slot and dividing into two streams the glass passing through the slot, and a member arranged in the path of each stream and adapted to divide the stream into an inner and outer stream, the parts being so arranged that the streams converge as they pass downward and unite to form a single sheet.

29. The method of producing sheet glass, consisting in passing more than two streams of molten glass downwardly from the bottom of a container, causing the streams to converge and form a single sheet, and guiding the converging streams by means within the glass extending below the bottom of the container.

30. The method of producing sheet glass, consisting in passing a sheet of molten glass downwardly from an opening in the bottom of a container, and simultaneously applying heated gases to the glass drawn through the side portions of the opening while retarding the downward movement of the glass by a plurality of members within the glass.

31. The method of producing sheet glass, consisting in passing a sheet of molten glass downwardly from an opening in the bottom of a container, and simultaneously applying heated gases to the glass drawn through the side portions of the opening, which glass forms the surfaces of the finished sheet, while retarding the movement of said glass by its cohesion to more slowly moving inner portions of the glass.

32. In sheet glass apparatus, a plurality of sheet forming slabs, and means for supplying both sides of each slab with molten glass from a single tank furnace.

33. In sheet glass apparatus, means to create a downwardly moving flow of molten glass, an intercepting member, and a plurality of slabs arranged beneath the intercepting member whereby streams of glass flowing from the intercepting member will be received upon and flowed down the slabs.

34. The process of producing sheet glass consisting in dividing a downwardly moving flow of glass into a plurality of streams and then flowing each stream into sheet form.

35. The process of producing sheet glass consisting in dividing a flow of molten glass into a plurality of streams, and then flowing each stream down both sides of a slab to produce a sheet.

36. The process of producing sheet glass, consisting in producing a plurality of streams of molten glass, then passing the streams over the opposite sides of spaced guide members, one stream on each side thereof, and then uniting the streams into sheet form.

37. The process of producing sheet glass, consisting in producing a plurality of streams of glass, then passing the streams over the opposite sides of spaced guide members, one stream on each side thereof, the streams flowing down the sides of the guide members and uniting at the bottom of each of said members.

In testimony whereof, I have hereunto signed my name to this specification.

EDWARD DANNER.